Sept. 15, 1964 E. DAVIES 3,149,260

LINE-FIELD DISTORTION CROSS-CURRENT COMPENSATING CIRCUIT

Filed July 17, 1961

PRIOR ART

INVENTOR
Eric Davies;
BY Baldwin & Wight,
His ATTORNEYS

United States Patent Office 3,149,260

Patented Sept. 15, 1964

3,149,260

LINE-FIELD DISTORTION CROSS-CURRENT COMPENSATING CIRCUIT

Eric Davies, Danbury, England, assignor to The Marconi Company Limited, a British company Filed July 17, 1961, Ser. No. 124,458
Claims priority, application Great Britain, Aug. 17, 1960, 28,561/60
4 Claims. (Cl. 315—27)

This invention relates to television scanning circuit arrangements suitable for use in connection with television camera tubes employing electro-magnetic deflection.

Figure 1:
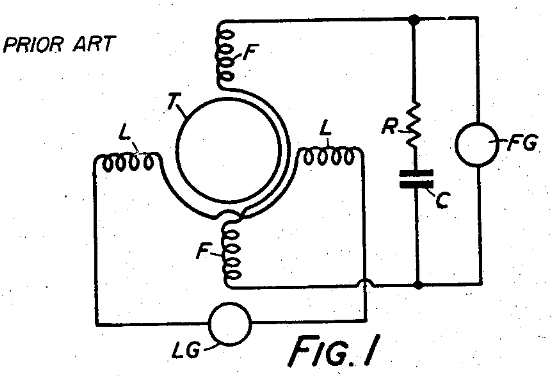
Figure 2:
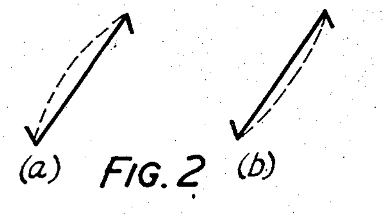
Figure 3:
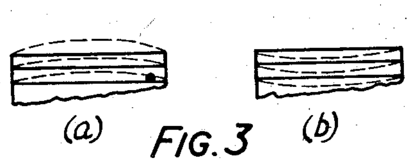
Figure 4:
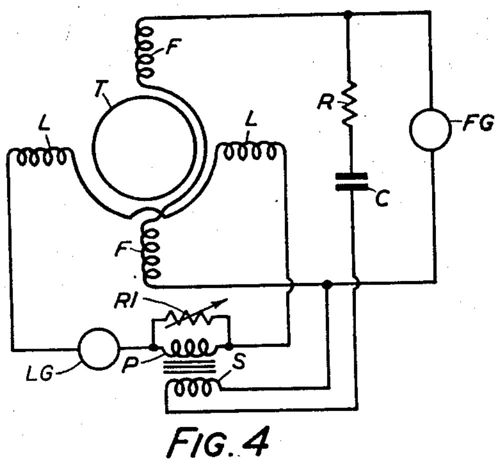

The invention is illustrated in and explained in connection with the accompanying drawings in which FIG. 1 is a diagrammatic figure illustrating a typical known electromagnetic scanning arrangement for a television camera tube; FIGS. 2*a* and 2*b* graphically represent certain waveforms which occur in the apparatus of FIG. 1; FIGS. 3*a* and 3*b* illustrate forms of distortion occurring due to waveforms as shown in FIGS. 2*a* and 2*b*; and FIG. 4 is a diagram of one embodiment of this invention.

For various reasons it may happen that line scanning currents fed to the line deflection coils of a television camera tube may cause a line frequency component to be induced with the field deflection coils. Thus, for example, in some camera equipments the line and field deflection coils are deliberately slightly displaced with respect to one another from the relative position in which zero coupling exists between them, this displacement being provided in order to correct in known manner for the well-known trapezium distortion apt to be produced by a camera tube deflection coil yoke. In such a case there will, of course, be some line scanning component of current induced into the field deflection coils. If the saw tooth current generators driving the line and field deflection coils are of high impedance, such induction, though theoretically undesirable, will be of negligible importance practically. If, however, the field saw tooth current generator is not of high impedance or if, though of high impedance, it is shunted—as is often done for various reasons of general design—by circuit elements of relatively low impedance, cross coupling between the line and field coils will result in the induction into the field coils of a current which is no longer of linear saw-tooth wave shape and therefore will produce a disturbing raster distortion which cannot be corrected by adjustment of the coil positions.

The nature of this type of raster distorting effect, which can arise in other ways as well, is explained in connection with and illustrated in FIGURES 1, 2*a*, 2*b*, 3*a* and 3*b*. In FIGURE 1, L are the line deflection coils of a television camera tube represented by the circle T and LG is a high impedance line frequency saw-tooth current wave source for the coils L. Similarly F are the field deflection coils and FG the field frequency saw-tooth current wave source therefor. Across the coils F and the source FG is a circuit consisting of a resistance element R and a condenser C, these circuit elements being damping elements provided, in accordance with known practice, in order to prevent "ringing" due to line frequency induced into the field coils. It may be shown that, in such an arrangement, the induced current of line frequency which flows in the field coils is the compounded resultant of a saw-tooth wave as shown in full lines in FIGURES 2*a* and 2*b* and an approximately parabolically curved component as shown in broken lines in these figures and which may be either above the saw tooth flank as in FIGURE 2*a* or below it as in FIGURE 2*b*. The effect of this is to distort the scanning raster by transforming what should be straight lines into "bowed" lines as represented diagrammatically in broken line manner in FIGURES 3*a* and 3*b*, the former figure corresponding to FIGURE 2*a* and the latter to FIGURE 2*b*. The present invention seeks to provide simple means for correcting for distortion of the above described nature.

According to this invention a line raster television scanning circuit arrangement of the kind employing line scanning coils fed from a line frequency current wave source, and field scanning coils fed from a field frequency current wave source, comprises a correcting coupling circuit between the line scanning coil circuit and the field scanning coil circuit, said coupling circuit being dimensioned and arranged to inject into the field scanning coil circuit a correction voltage which substantially compensates for raster distorting current components induced into the field scanning coil circuit as a result of cross coupling between the line and field coils.

Preferably the correcting coupling circuit comprises a transformer having its primary in series with the line scanning coils and its secondary included in circuit with the field scanning coils. Although the coupling co-efficient of the correcting coupling circuit may be adjusted to secure optimum compensation it is preferred to obtain optimum compensation by adjustment of the magnitude of a suitable circuit impedance provided for the purpose, e.g. where the correcting coupling circuit is transformer coupled, by a resistance across the transformer primary.

FIGURE 4 illustrates a preferred embodiment of the invention and as the same references are used in FIGURES 1 and 4 for the same parts, very little further description of FIGURE 4 is required. As will be seen, the difference between FIGURES 1 and 4 is that in FIGURE 4 the primary P of a transformer is inserted in series with the coils L and the secondary S of that transformer is inserted in series with the elements R and C across the coils F. A resistance R1 is in shunt with the primary P. The circuit elements of FIGURE 4 are so dimensioned and arranged that an approximately parabolic correcting current wave is inserted via the transformer P–S into the circuit of the field coils F, this correcting wave being of correct phase and substantially correct amplitude to cancel out the undesired approximately parabolic current waveform component induced due to cross coupling between the coils F and L, leaving only a saw-tooth wave residue of current which can be corrected for by adjustment of the relative positions of the line and field coils. The sense of connection of the windings of the transformer is chosen to produce the required cancellation (depending upon whether the approximately parabolic current wave component to be cancelled is as in FIGURE 2*a* or as in FIGURE 2*b*) and the resistance R1 is adjusted—this is best done by trial and error—to give optimum compensation. The necessary adjustment may be effected with a variable resistor or rheostat at R1 as shown in FIGURE 4; alternatively, separate fixed resistors of different magnitudes may be tried until the best results are obtained.

Suitable practical values for the components in FIGURE 4 are:

| | |
|---|---|
| Coils F | 17 millihenries. |
| Resistance element R | 330 ohms. |
| Condenser C | 0.5 microfarads. |
| Resistance R1 | 3 ohms. |
| Transformer ratio | 1:1, inductance 3 millihenries. |

The invention is not limited to the particular arrangement shown in FIGURE 4, nor will the waveform component to be compensated always be substantially parabolic. Obviously by suitable circuit dimensioning the invention may be used to cancel out other undesired curved waveform components. Where the scanning generators are of low impedance the elements R and C may not be required, in which case a "bucking voltage" taken from the line coil circuit via (for example) a transformer as illustrated in FIGURE 4 would simply be superimposed in the field coil circuit by insertion in series with the field coil scanning generator.

I claim:

1. A line raster television scanning circuit arrangement of the kind employing line scanning coils fed from a line frequency current wave source, and field scanning coils fed from a field frequency current wave source, said arrangement comprising a correcting circuit coupled between the line scanning coil circuit and the field scanning coil circuit, said coupling circuit being dimensioned and arranged to inject into the field scanning coil circuit a correction voltage which substantially compensates for raster distortion current components induced into the field scanning coil circuit as a result of cross coupling between the line and field coils.

2. An arrangement as claimed in claim 1 wherein the correcting circuit comprises a transformer having its primary in series with the line scanning coils and its secondary included in circuit with the field scanning coils.

3. An arrangement as claimed in claim 2 wherein adjustment of the compensation obtained is effected by adjustment of the magnitude of a circuit impedance connected to said transformer.

4. An arrangement as claimed in claim 3 wherein said circuit impedance is a resistance connected across the transformer primary.

References Cited in the file of this patent

UNITED STATES PATENTS

| | | |
|---|---|---|
| 2,521,741 | Parker | Sept. 12, 1950 |
| 2,713,651 | Coffey | July 19, 1955 |
| 2,907,825 | Janssen | Oct. 6, 1959 |
| 3,004,188 | Van Hutten | Oct. 10, 1961 |